(12) United States Patent
Cravener et al.

(10) Patent No.: US 10,703,461 B2
(45) Date of Patent: Jul. 7, 2020

(54) BLADE FOLD METHOD AND APPARATUS FOR A TILT ROTOR HUB

(71) Applicant: Bell Helicopter Textron Inc., Fort Worth, TX (US)

(72) Inventors: Kyle Thomas Cravener, Watauga, TX (US); Glenn Shimek, Kennedale, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 100 days.

(21) Appl. No.: 15/963,516

(22) Filed: Apr. 26, 2018

(65) Prior Publication Data

US 2019/0329867 A1 Oct. 31, 2019

(51) Int. Cl.
| | |
|---|---|
| B64C 11/28 | (2006.01) |
| B64C 29/00 | (2006.01) |
| B64C 3/56 | (2006.01) |
| B64C 11/06 | (2006.01) |
| F16C 17/02 | (2006.01) |
| B64C 11/30 | (2006.01) |

(52) U.S. Cl.
CPC ............... *B64C 11/28* (2013.01); *B64C 3/56* (2013.01); *B64C 11/06* (2013.01); *B64C 11/30* (2013.01); *B64C 29/0033* (2013.01); *F16C 17/026* (2013.01); *F16C 2326/43* (2013.01)

(58) Field of Classification Search
None
See application file for complete search history.

(56) References Cited

U.S. PATENT DOCUMENTS

| | | | |
|---|---|---|---|
| 2,623,713 A | 12/1952 | Foster | |
| 2,658,576 A | 11/1953 | Mosinskis | |
| 3,026,942 A | 3/1962 | Cresap | |
| 3,153,455 A | 10/1964 | Mosinskis | |
| 3,625,631 A | 12/1971 | Covington, Jr. et al. | |
| 3,652,185 A | 3/1972 | Cresap et al. | |
| 3,967,918 A | 7/1976 | Mouille et al. | |
| 4,252,504 A * | 2/1981 | Covington | B64C 27/50 416/143 |
| 4,257,739 A | 3/1981 | Covington et al. | |
| 4,268,222 A * | 5/1981 | Bernard | B64C 27/50 416/1 |
| 4,427,340 A * | 1/1984 | Metzger | B64C 27/51 416/134 A |
| 4,522,563 A * | 6/1985 | Reyes | B64C 27/43 416/134 A |
| 4,691,878 A | 9/1987 | Vaughan et al. | |
| 5,031,858 A | 7/1991 | Schellhase et al. | |

(Continued)

OTHER PUBLICATIONS

Paulson, Jared Mark, "U.S. Appl. No. 15/845,720," filed Dec. 18, 2017.

(Continued)

*Primary Examiner* — Michael Lebentritt
(74) *Attorney, Agent, or Firm* — Ross T. Robinson

(57) ABSTRACT

A folding rotor blade assembly for an aircraft a yoke, an inboard beam coupled to the yoke, an inboard centrifugal force bearing coupled to the inboard beam, a grip coupled to the inboard beam, an outboard bearing housing coupled to the grip, and a rotor blade pivotally coupled to the grip by a blade fold bolt that is positioned outboard of the outboard bearing housing.

20 Claims, 7 Drawing Sheets

(56) References Cited

U.S. PATENT DOCUMENTS

| | | | |
|---|---|---|---|
| 5,059,094 A * | 10/1991 | Robinson | B64C 27/33 |
| | | | 416/134 A |
| 5,096,380 A | 3/1992 | Byrnes et al. | |
| 5,337,974 A | 8/1994 | Rumberger et al. | |
| 5,358,381 A | 10/1994 | Covington et al. | |
| 5,645,400 A | 7/1997 | Hunter et al. | |
| 6,036,442 A | 3/2000 | Certain et al. | |
| 7,530,790 B2 | 5/2009 | Cabrera et al. | |
| 8,360,727 B2 | 1/2013 | Stamps et al. | |
| 9,156,545 B1 | 10/2015 | Fenny et al. | |
| 9,169,010 B2 | 10/2015 | Foskey et al. | |
| 9,499,262 B2 | 11/2016 | Foskey et al. | |
| 2004/0026564 A1 * | 2/2004 | Romani | B64C 27/50 |
| | | | 244/17.11 |
| 2013/0149151 A1 | 6/2013 | Rauber et al. | |
| 2014/0271199 A1 * | 9/2014 | Maresh | B64C 27/33 |
| | | | 416/134 A |
| 2014/0271222 A1 * | 9/2014 | Maresh | B64C 27/33 |
| | | | 416/244 R |
| 2015/0125300 A1 | 5/2015 | Stamps et al. | |
| 2016/0152329 A1 | 6/2016 | Tzeng et al. | |
| 2017/0144746 A1 | 5/2017 | Schank et al. | |
| 2017/0320567 A1 * | 11/2017 | Miller | B64C 27/33 |
| 2018/0229830 A1 * | 8/2018 | Foskey | B64C 11/28 |
| 2018/0244377 A1 * | 8/2018 | Chan | B64C 27/605 |

OTHER PUBLICATIONS

Paulson, Jared Mark, "U.S. Appl. No. 15/845,810," filed Dec. 18, 2017.

Paulson, Jared Mark, "U.S. Appl. No. 15/845,876," filed Dec. 18, 2017.

Paulson, Jared Mark, "U.S. Appl. No. 15/845,928," filed Dec. 18, 2017.

Paulson, Jared Mark, "U.S. Appl. No. 15/845,967," filed Dec. 18, 2017.

Paulson, Jared Mark, "U.S. Appl. No. 15/846,011," filed Dec. 18, 2017.

Baldwin, Tyler Wayne, "U.S. Appl. No. 15/881,980," filed Jan. 29, 2018.

Paulson, Jared Mark, "U.S. Appl. No. 16/016,280," filed Jun. 22, 2018.

* cited by examiner

BLADE FOLD METHOD AND APPARATUS FOR A TILT ROTOR HUB

BACKGROUND

This section provides background information to facilitate a better understanding of the various aspects of the disclosure. It should be understood that the statements in this section of this document are to be read in this light, and not as admissions of prior art.

Rotorcraft and tiltrotor aircraft are often transported or stored on vessels or in areas where storage space is limited. In order to reduce the space that each aircraft occupies such that a maximum number of aircraft can be accommodated within the limited storage space, blade assemblies of some rotor systems can be folded so that each rotor blade is generally parallel with each other rotor blade in order to reduce the overall profile of the blade assembly. Typically, each rotor blade is folded about a single pivot point positioned outboard of a yoke that is a mast. The mast is coupled to an engine or motor to supply to torque to the yoke.

In an effort to transport or store larger numbers of rotorcraft and tiltrotor aircraft, current naval vessels have reduced the allotted storage space available for each aircraft. Present rotor blade folding systems cannot accommodate the reduced space parameters. This requirement necessitates a tighter grouping of the rotor blades than is currently available by prior art rotor blade folding systems.

SUMMARY

A folding rotor blade assembly for an aircraft includes a yoke, an inboard beam coupled to the yoke, an inboard centrifugal force bearing coupled to the inboard beam, a grip coupled to the inboard beam, an outboard bearing housing coupled to the grip, and a rotor blade pivotally coupled to the grip by a blade fold bolt that is positioned outboard of the outboard bearing housing.

A folding rotor blade assembly for an aircraft includes a yoke connected to and axially aligned with a hub spring assembly, an inboard beam housing an inboard centrifugal force bearing, the inboard beam connected to the yoke, a grip connected at a first end to the inboard beam, an outboard bearing housing connected to a second end of the grip, an outboard bearing assembly coupled between the outboard bearing housing and the second end of the grip, a blade fold support connected to the grip and the outboard bearing housing, and a rotor blade connected to the grip at a pivotal connection positioned outboard of the outboard bearing assembly.

A method includes pitching a first rotor blade of a rotor blade assembly, the rotor blade assembly including an inboard bearing assembly comprising an inboard centrifugal force bearing and connected to a yoke and a grip, an outboard bearing assembly connected to the yoke and the grip, a blade fold support connected to the grip. The first rotor blade is pivotally connected to the blade fold support via a blade fold bolt, the blade fold support configured to prevent a pivoting rotation of the first rotor blade relative to the yoke when the blade fold support is in a locked configuration, and the blade fold bolt providing a pivot axis outboard of the outboard bearing assembly. The method includes unlocking the first rotor blade to allow the first rotor blade to pivot relative to the yoke and rotating the rotor blade about the pivot axis.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
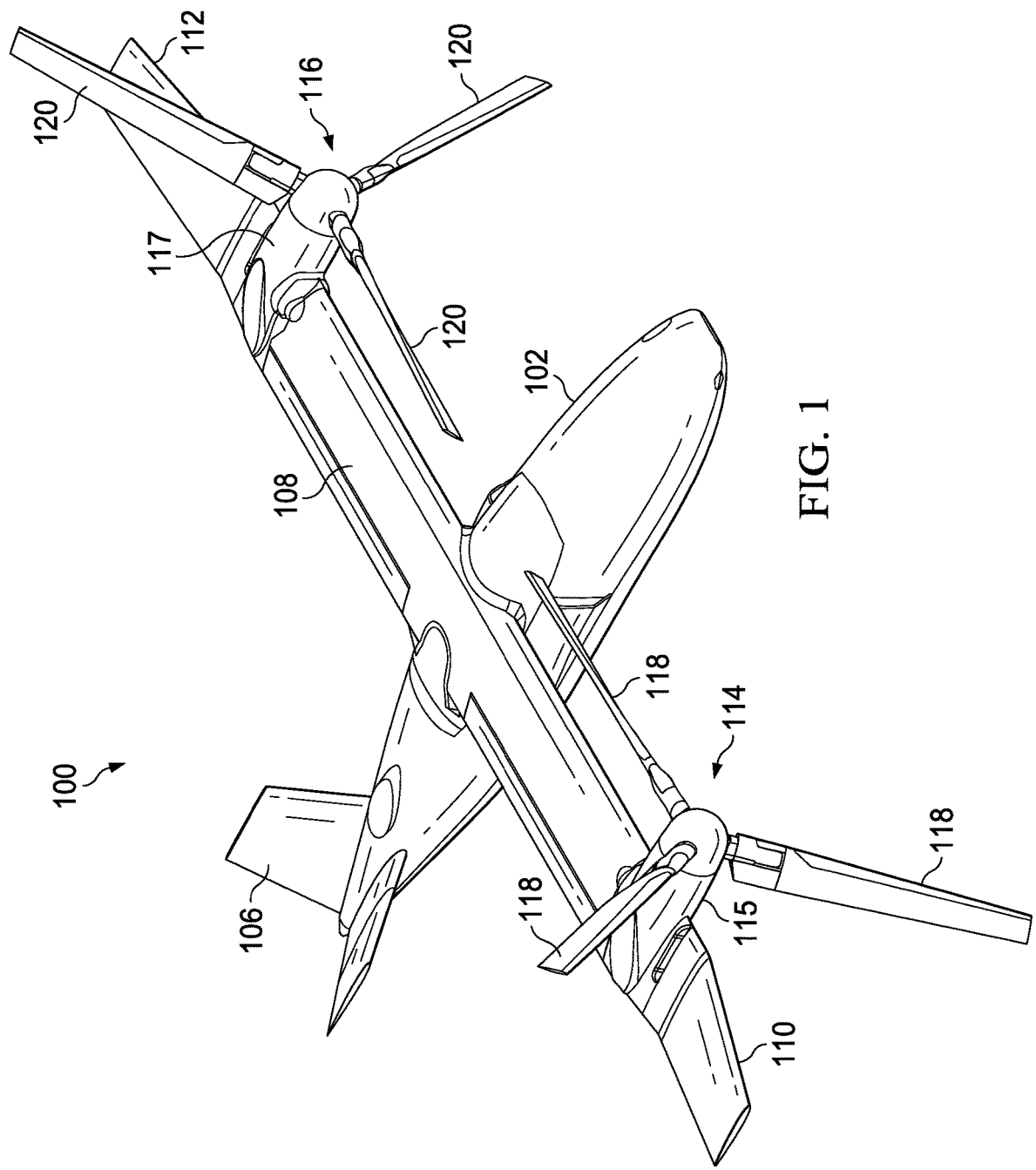
FIG. 1 is a perspective view of an exemplary tiltrotor aircraft configured in a flight ready position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 2:
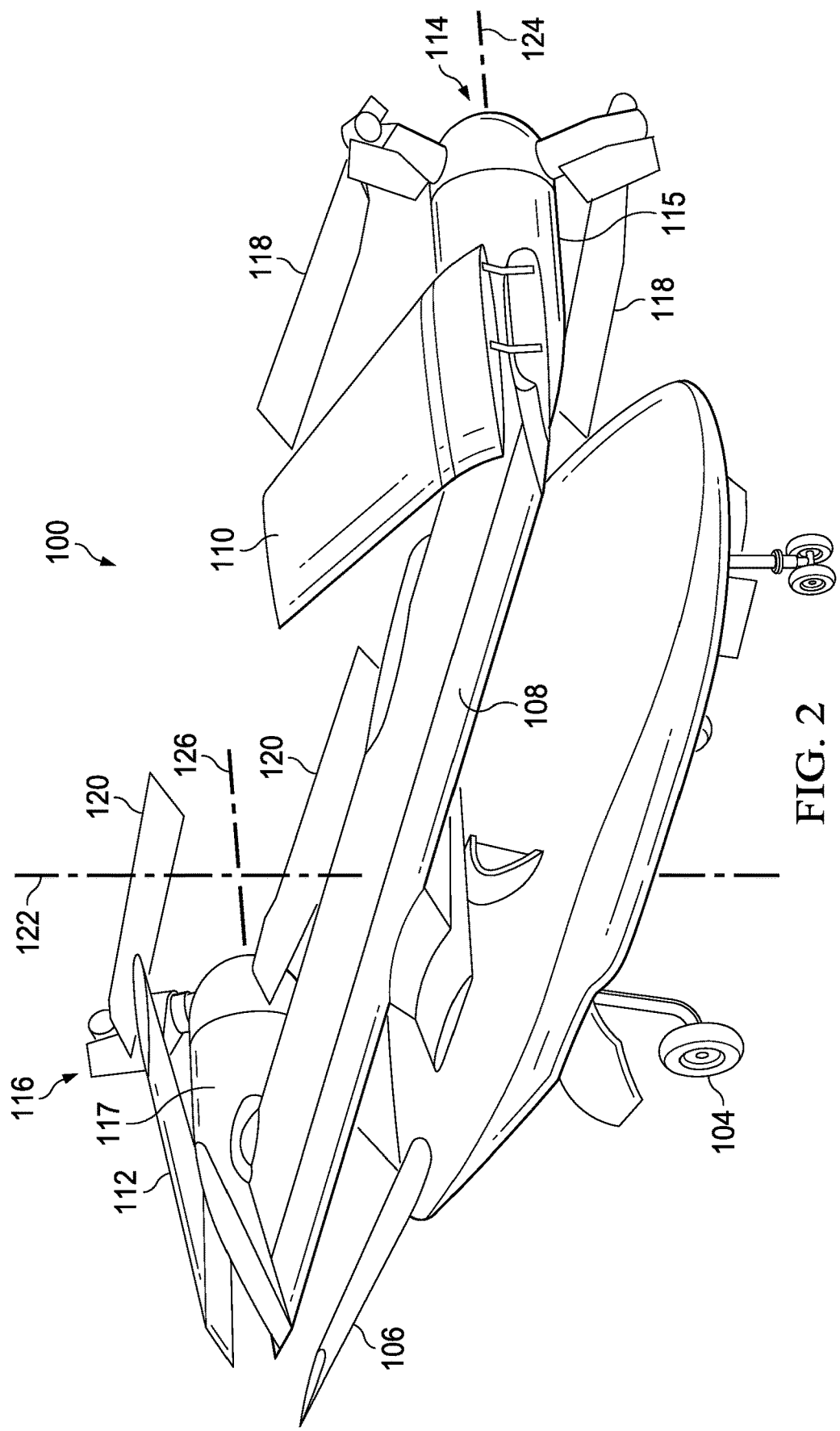
FIG. 2 is a perspective view of an exemplary tiltrotor aircraft configured in a stowed position according to aspects of the disclosure.

Referring to FIGS. 1 and 2, an exemplary tiltrotor aircraft 100 is shown. FIG. 1 is a perspective view of the tiltrotor aircraft 100 configured in a flight ready position and FIG. 2 is a perspective view of the tiltrotor aircraft 100 configured in a stowed position. The tiltrotor aircraft 100 includes a fuselage 102, landing gear 104, a tail member 106, a wing 108, a wing tip 110, a wing tip 112, a rotor system 114, and a rotor system 116. The rotor system 114 is housed within a nacelle 115 located on an end portion of the wing 108 that is proximal the wing tip 110. The rotor system 116 is housed within nacelle 117 located on an opposite end portion of the wing 108 that proximal the wing tip 112. The wing tip 110 is pivotable at a location on the wing 108 that is outboard the nacelle 115. The wing tip 112 is pivotable at a location on the wing 108 that is outboard the nacelle 117. Nacelles 115, 117 are pivotable between a helicopter mode where the rotor systems 114, 116 are generally vertical and an airplane mode where the rotor systems 114, 116 are generally horizontal.

The nacelles 115, 117 are substantially symmetric relative to each other about the fuselage 102.

The rotor system 114 includes a plurality of foldable rotor blades 118 and the rotor system 116 includes a plurality of foldable rotor blades 120. The rotor blades 118, 120 may rotate in opposite directions to cancel torque associated with the operation of each rotor system 114, 116. An angle of the pivotable nacelles 115, 117 relative to the wing 108, as well as the pitch of rotor blades 118, 120, can be adjusted in order to selectively control direction, thrust, and lift of the tiltrotor aircraft 100. The rotor systems 114, 116 are illustrated in the context of the tiltrotor aircraft 100; however, a singular rotor system with foldable rotor blades can be implemented on other non-tilting rotor and helicopter rotor systems. It should also be appreciated that teachings relative to the tiltrotor aircraft 100 may apply to other aircraft such as airplanes and unmanned aircraft which would benefit from folding rotor blades.

The fuselage 102 represents a body of the tiltrotor aircraft 100 and may be coupled to the rotor systems 114, 116 such that the rotor systems 114, 116, along with the rotor blades 118, 120, may move tiltrotor aircraft 100 through the air. The landing gear 104 supports the tiltrotor aircraft 100 when the tiltrotor aircraft 100 is landing or when the tiltrotor aircraft 100 is at rest on the ground. FIG. 2 illustrates a vertical axis 122 that is generally perpendicular to a longitudinal axis 126 of the wing 108. An intersection of the vertical axis 122 and the longitudinal axis 126 is generally positioned at an intersection of the fuselage 102 and the wing 108. FIG. 1 represents tiltrotor aircraft 100 in flight ready position in an airplane mode. FIG. 2 represents tiltrotor aircraft 100 in a stowed position with the rotor blades 118 folded generally parallel to each other and the rotor blades 120 folded generally parallel to each other in order to reduce dimensions of the tiltrotor aircraft 100 to whatever degree is required in response storage space restrictions. In the stowed position, the wing 108 is swiveled approximately 90° to generally align with a length of the fuselage 102.

Referring to tiltrotor aircraft in general, each rotor system includes a mast driven by a power source (e.g., an engine or motor). Each rotor system also includes a yoke connected to the mast, with rotor blades indirectly connected to the yoke with bearings. The bearings may be, for example, elastomeric bearings constructed from a rubber type material that absorb vibration. The bearings may include inboard bearings connecting a cuff or grip of a rotor blade to the yoke proximate the mast and outboard bearings connecting the rotor blade to an outboard end of the yoke. The cuff or grip may be separate from the rotor blade or may be integrally formed with the rotor blade. Other combinations of inboard and outboard bearings with or without cuffs or grips are possible as well as the removal of one or the other of the bearings. The bearings accommodate forces acting on the rotor blades allowing each rotor blade to flex with respect to the yoke/mast and other rotor blades. The weight of the rotor blades and the lift of rotor blades generated by action of the rotor blades may result in transverse forces on the yoke and other components. Examples of transverse forces include forces resulting from flapping and coning of the rotor blades. Flapping can refer to an up-and-down movement of a rotor blade positioned at a right angle to the plane of rotation or can refer to a gimballing of the hub or a teetering rotor. Coning generally refers to an upward flexing of a rotor blade due to lift forces acting on the rotor blade. Generally speaking, the hub is not rigidly connected to the mast and a differential coning of the rotor blades can cause the hub to tilt relative to the mast.

The rotor blades may be subject to other forces, such as axial, lead/lag, and feathering forces. Axial forces generally refer to a centrifugal force on the rotor blades resulting from rotation of the rotor blades. Lead and lag forces generally refer to forces resulting from a horizontal movement of the rotor blades about a vertical pin that occur if, for example, the rotor blades do not rotate at the same rate as the yoke. Feathering forces generally refer to forces resulting from twisting motions that cause a rotor blade to change pitch. The power source, mast, and yoke are components for transmitting torque. The power source may include a variety of components including an engine, a transmission, and differentials. In operation, the mast receives torque from the power source and rotates the yoke. Rotation of the yoke causes the rotor blades to rotate with the mast and yoke.

Figure 3:
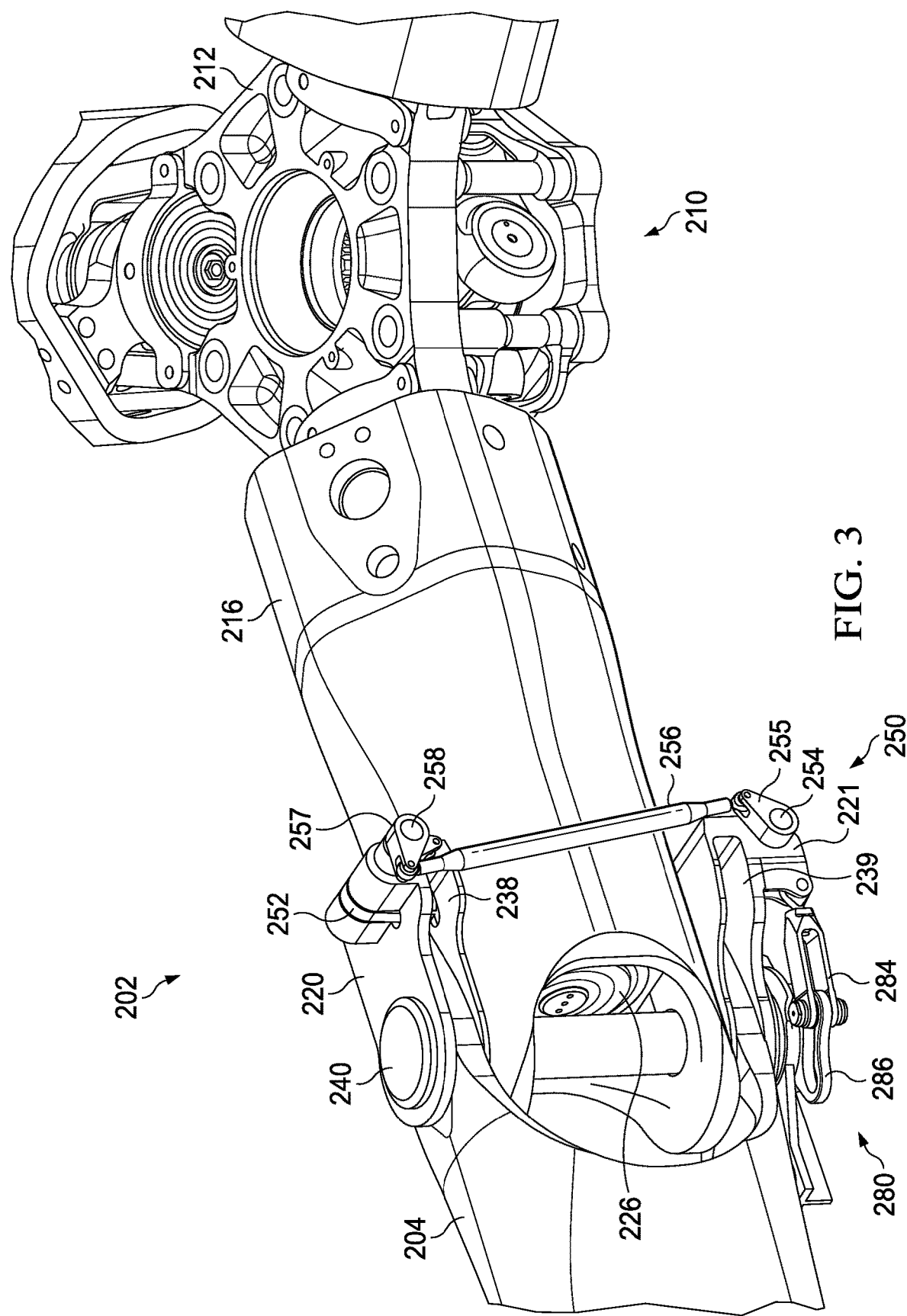
FIG. 3 is a partial perspective view of an exemplary blade assembly according to one or more aspects of the disclosure.
Figure 4:
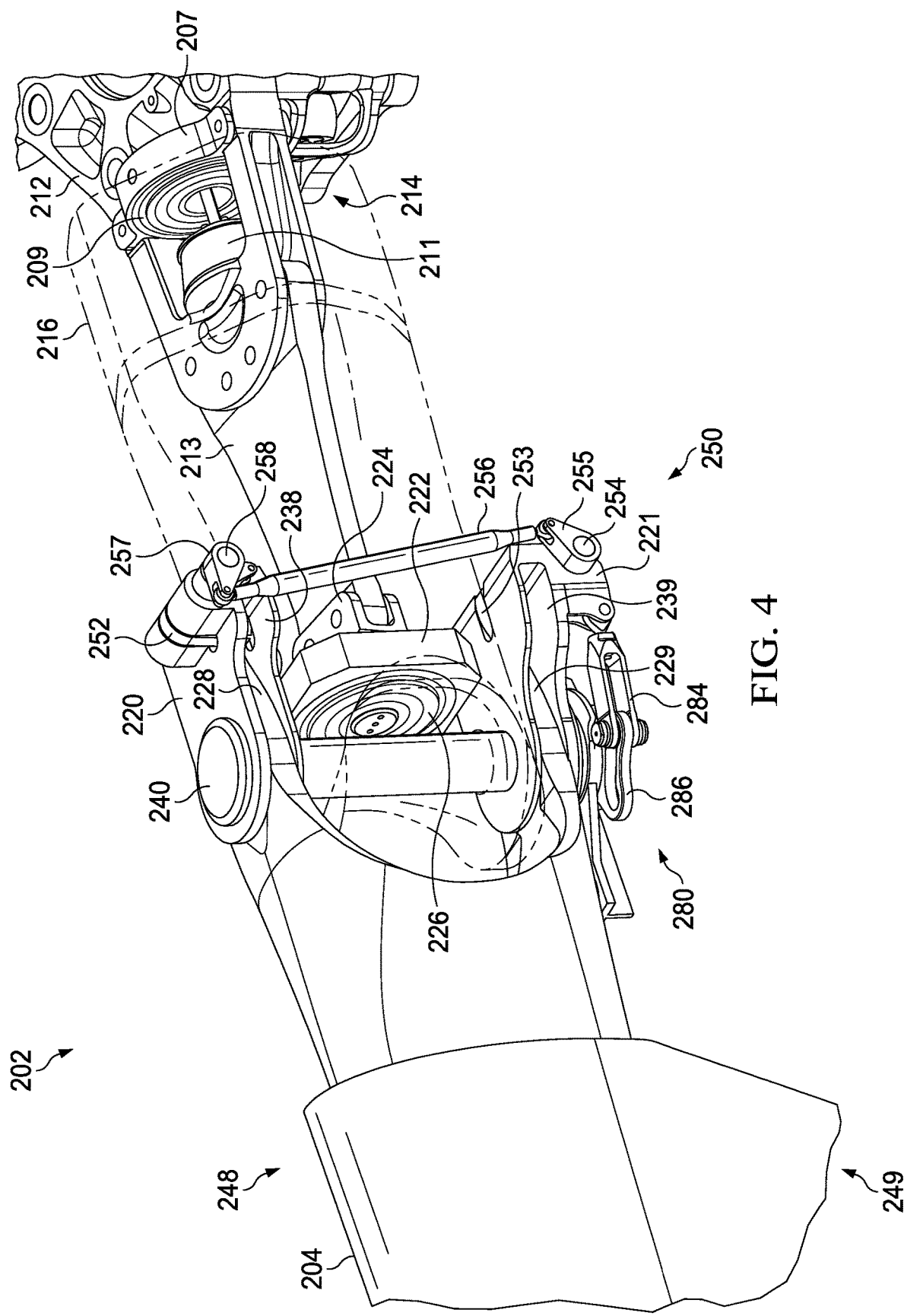
FIG. 4 is a partial perspective view of the exemplary blade assembly of FIG. 3 according to one or more aspects of the disclosure.
Figure 5:
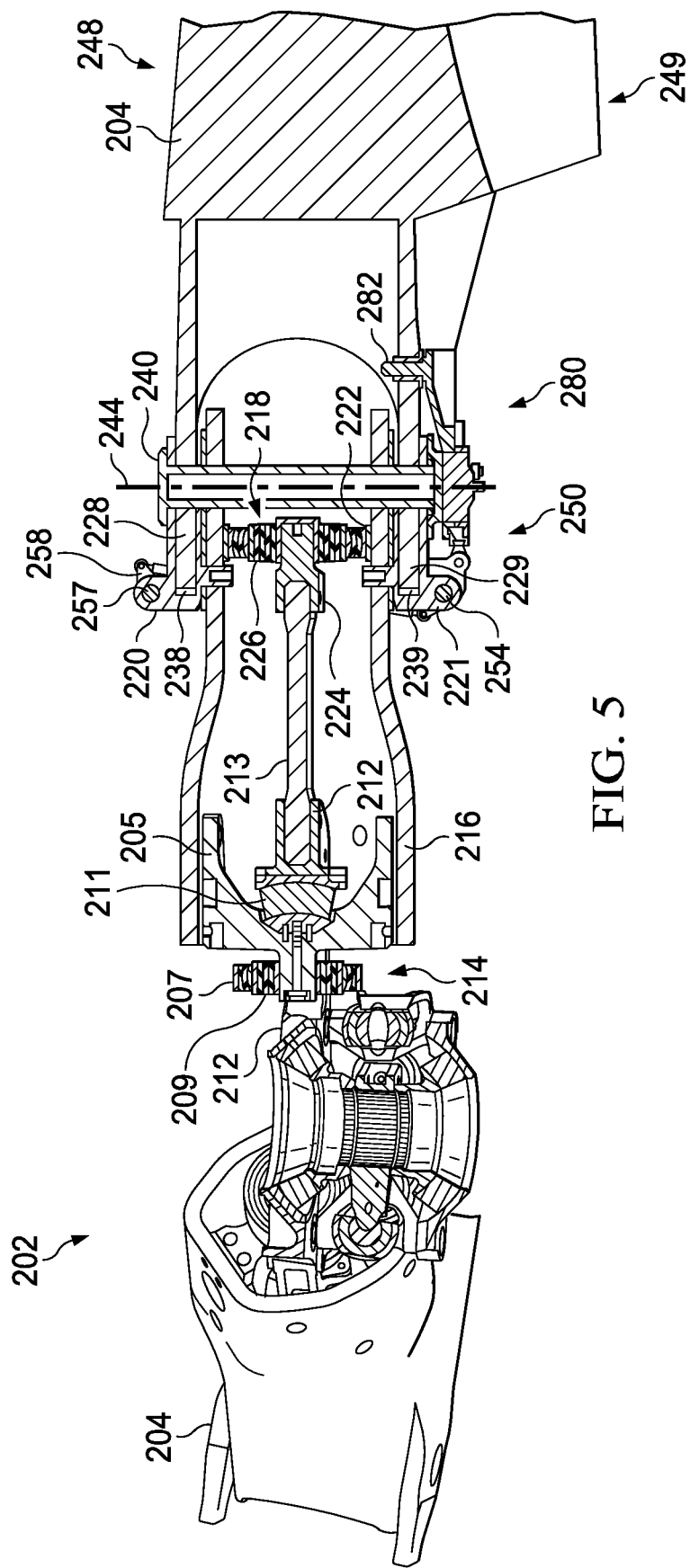
FIG. 5 is a partial perspective view in partial cross-section of an exemplary blade assembly according to one or more aspects of the disclosure.

Referring to FIGS. 3-5, a blade assembly 202 is shown. FIG. 3 is a partial perspective view of the blade assembly 202 in an unfolded position according to aspects of the disclosure. FIG. 4 is a partial perspective view of the blade assembly 202 with a grip 216 partially hidden to show components located inside the grip 216. FIG. 5 is a partial perspective view in partial cross-section of the blade assembly 202. Each rotor system 114, 116 comprises a separate blade assembly 202. In the interest of clarity, a single blade assembly 202 is described herein with the understanding that tiltrotor aircraft 100 comprises a pair of similarly configured blade assemblies 202. The rotor blade assembly 202 includes three rotor blades 204. In exemplary embodiments, the rotor blades 204 are similar to rotor blades 118, 120. In FIGS. 3-5, all three rotor blades 204 are not shown. In the unfolded position, each rotor blade 204 is generally equally spaced from each other rotor blade 204 around a yoke 212. For example, in the three rotor blade configuration shown in FIGS. 3-5, approximately 120° separates each rotor blade 204. It should also be appreciated that teachings regarding blade assembly 202 can apply to blade assemblies 202 having greater or fewer rotor blades 204.

The yoke 212 is mounted to the hub spring assembly 210. Yoke flexures 213 are coupled to and extend from the yoke 212, one for each rotor blade 204. In the interest of clarity, a single connection between the yoke 212 and one rotor blade 204 is described herein with the understanding that blade assembly 202 comprises a similarly configured connection for each yoke 212 and rotor blade 204 interface.

An inboard bearing assembly 214 connects the yoke 212 to the grip 216 via an inboard shear bearing 209 and an inboard centrifugal force ("CF") bearing 211. The inboard bearing assembly 214 includes an inboard beam 205, a clamp plate 207, the inboard shear bearing 209, and the inboard CF bearing 211. For purposes of clarity, the inboard beam 205 is not shown in FIG. 4. The clamp plate 207 is mounted to yoke 212 proximate hub spring assembly 210 and houses the inboard shear bearing 209. The inboard beam 205 is connected to the grip 216 outboard of the clamp plate 207 and houses the inboard CF bearing 211. The inboard shear bearing 209 is connected to the inboard CF bearing 211 via the inboard beam 205.

An outboard bearing assembly 218 connects the yoke flexure 213 to the grip 216 via an outboard shear bearing 226. The outboard bearing assembly 218 includes an outboard bearing housing 222 that houses a spindle 224 and the outboard shear bearing 226. The spindle 224 is mounted to a tip of the yoke flexure 213 outboard of inboard bearing assembly 214. The outboard shear bearing 226 extends from the spindle 224 and connects to the outboard bearing housing 222, which is in turn connected to the grip 216.

Blade fold supports 220, 221 are mounted to the grip 216 and coupled to the rotor blade 204 such that relative movement between the blade fold supports 220, 221 and the grip 216 is prevented and rotational movement of the rotor blade 204 relative to the blade fold supports 220, 221 is permitted. The blade fold supports 220, 221 are secured to the grip 216 with a blade fold bolt 240. The blade fold supports 220, 221 may be further secured to the grip 216 with additional bolts, pins, rivets, welds and the like to prevent rotation of the blade fold supports 220, 221 relative to the grip 216. The blade fold bolt 240 passes through axially aligned holes of the blade fold supports 220, 221, the rotor blade 204, and the grip 216. Utilizing a unitary blade fold bolt 240 provides a stronger pivot support than a similarly sized split-bolt design. In some embodiments, the blade fold bolt 240 passes through additional components, such as a rotor blade pivot linkage system 280. The rotor blade pivot linkage system 280 acts as a guide that limits a range of motion through which the rotor blade 204 may pivot relative to the blade fold supports 220, 221. As shown in FIG. 5, the rotor blade pivot linkage system 280 is secured to the rotor blade 204 with a pin 282 and to the blade fold support 221 by a linkage 284. The rotor blade pivot linkage system 280 also includes a track 286 that limits a range of motion of the linkage 284.

The blade fold bolt 240 acts a pivot point for the rotor blade 204. In some rotor blade assembly designs, the CF bearing is positioned outboard of the outboard bearing assembly. In the rotor blade assembly 202, the inboard CF bearing 211 is instead located proximal the inboard beam 205 as illustrated in FIGS. 4 and 5 to make room for the blade fold bolt 240 to be positioned outboard of the outboard bearing housing 222. This arrangement of the inboard CF bearing 211 allows the blade fold bolt 240 to be positioned outboard of the outboard bearing housing 222 but more inboard than if the CF bearing 211 were located outboard of the outboard bearing housing 222. Locating the blade fold bolt 240 more inboard moves the pivot point of the rotor blades 204 inboard and allows the rotor blades 204 to take up less space when folded to give the aircraft 100 a smaller size when in the stowed position. The single blade fold bolt designs disclosed herein provide a design that has a more robust fold joint compared to some other blade-fold designs that offer a similar fold packaging size. This is in part due to the blade fold bolt 240's ability to handle shear loads. For example, the packaging of the blade assembly 202 is such that a relatively large blade fold bolt 240 may be used. Furthermore, compared to some other blade fold designs, the blade assembly 202 allows a single, non-split blade fold bolt 240 to be used, which can provide improved strength compared to split bolt designs.

In an exemplary embodiment, the blade fold support 220 includes slot 238 and blade fold support 221 includes slot 239. The slots 238, 239 are configured to work in conjunction with a lock assembly 250 to lock the rotor blade 204 in the extended position. When the lock assembly 250 is disengaged from the slots 238, 239, the rotor blade 204 may pivot about the blade fold bolt 240. Operation of the lock assembly 250 is discussed in more detail below.

The rotor blade 204 includes blade tangs 228, 229 that extend from an inboard end of the rotor blade 204. The blade fold bolt 240 has a central axis 244 about which the rotor blade 204 and blade tangs 228, 229 may rotate. The CF load path on each rotor blade 204 is from the blade tangs 228, 229, through the blade fold bolt 240, to the grip 216, to the inboard beam 205, and to the yoke 212. Each rotor blade 204 includes leading edge 248 and trailing edge 249.

FIG. 4 illustrates the blade tangs 228, 229 locked in an unfolded position by the lock assembly 250 (e.g., a tang lock) that is attached to blade fold supports 220, 221. The lock assembly 250 includes tabs 252, 253 configured to engage slots 238, 239, respectively. With tabs 252, 253 positioned as shown in FIG. 4, the blade tangs 228, 229 are locked in place and rotation of the blade 204 relative to the blade fold supports 220, 221 is prevented. In some embodiments, the tabs 252, 253 may be engaged/disengaged from the slots 238, 239 by an actuator operatively connected to lock assembly 250 to move tabs 252, 253 into and out of engagement with the slots 238, 239. For an example, an actuator may be coupled to a shaft 254 to rotate the tab 253 into and out of engagement with the slot 239. A cam 255 may be coupled to the shaft 254 and a linkage 256 to simultaneously actuate the tab 252 via a cam 257 and a shaft 258. In some embodiments, the lock assembly 250 may be actuated manually. In some embodiments, features other than the tabs 252, 253 can be used to lock the rotor blade 204 in the extended position. For example, a locking pin could be inserted through aligned bores of the blade fold supports 220, 221 and the rotor blade 204 to restrain movement of the rotor blade 204. The locking pin could be operated manually or actuated via an actuator.

In an exemplary embodiment, a swash plate is connected to the mast. Pitch links extend from the swash plate to pitch horns that are coupled to the grips 216. The swash plate, pitch links, and pitch horns are operatively connected to an actuator to pitch the rotor blades 204 relative to the yoke 212 in a first direction about a central longitudinal axis of each rotor blade 204. The central longitudinal axis may also be referred to as a blade pitch change axis. Each rotor blade 204 is free to rotate or "pitch" about its central longitudinal axis with respect to the yoke 212 in a range between 0° and 90°.

Figure 6:
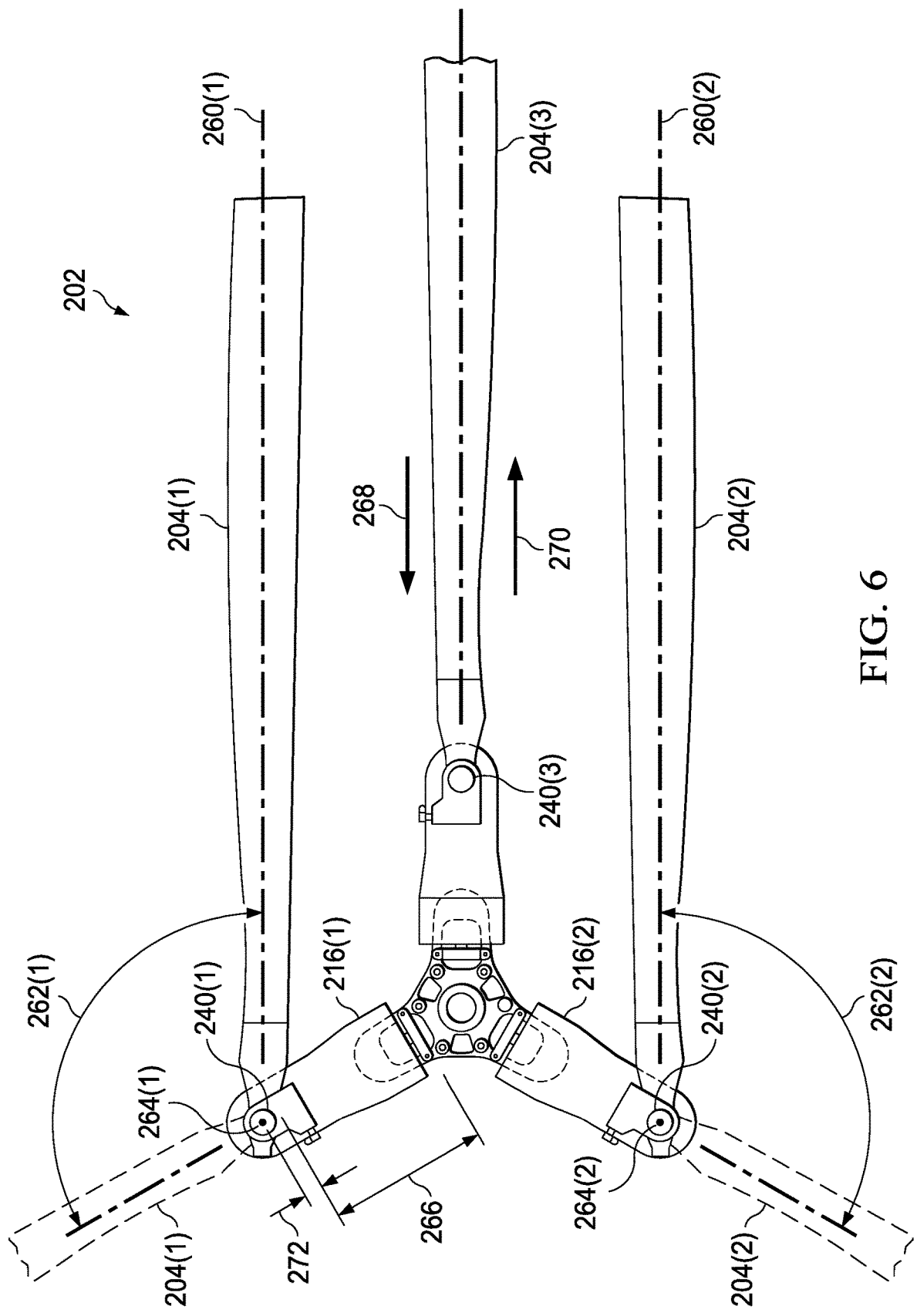
FIG. 6 is a top view of an exemplary rotor blade assembly in a folded position according to aspects of the disclosure.

Referring to FIG. 6, a blade assembly 202 is shown in a folded position. The blade assembly 202 includes rotor blades 204(1), 204(2), and 204(3). Rotor blades 204(1) and 204(2) are shown in a folded position and the rotor blade 204(3) is shown in an unfolded position. Unfolded rotor blades 204(1) and 204(2) are depicted in shadow. The rotor blade 204(1) has central longitudinal axis 260(1) and the rotor blade 204(2) has central longitudinal axis 260(2). The rotor blade 204(1) may be rotated about an arc 262(1) around pivot point 264(1). The arc 262(1) illustrates an angle through which the rotor 204(1) may pivot. The rotor blade 204(2) may be rotated about an arc 262(2) around a pivot point 264(2). The arc 262(2) illustrates an angle through which the rotor blade 204(2) may travel. Pivot points 264(1) and 264(2) correspond to the central axis 244 of the blade fold bolt 240 discussed above relative to FIG. 5. The blade fold bolt 240 provides a pivot point for the rotor blades 204(1), 204(2) with respect to grips 216(1), 216(2). In an exemplary embodiment, actuators are operatively connected to rotor blades 204(1), 204(2) to facilitate rotational movement of rotor blades 204(1), 204(2) about pivot points 264(1), 264(2), respectively. Arcs 262(1), 262(2) may be in the range of 90° to 180°. Physical stops or proximity sensors may be used to signal the actuators to cease rotational movement of the rotor blades 204(1), 204(2).

The rotor blade 204(1) is prevented from rotating about pivot point 264(1) until tabs 252, 253 have disengaged slots 238, 239 of the blade fold supports 220, 221 associated with rotor blade 204(1). Similarly, rotor blade 204(2) is prevented from rotating about pivot point 264(2) until tabs 252, 253 have disengaged slots 238, 239 of the blade fold supports 220, 221 associated with the rotor blade 204(2). In an exemplary embodiment, actuators are connected to tabs 252, 253 to move the tabs 252, 253 into and out of engagement with the slots 238, 239.

A distance 266 illustrates spacing between the inboard shear bearing 209 and the outboard shear bearing 226. The distance 266 is an optimal distance between the inboard shear bearing 209 and the outboard shear bearing 226 for a rotor blade assembly of a particular aircraft. The distance 266 is dependent on the particular aircraft's loads and dynamics and may be set accordingly. An inboard direction 268 points, with respect to each unfolded rotor 204, toward the yoke 212 of the blade assembly 202 and an outboard direction 270 points, with respect to each unfolded rotor 204, away from the yoke 212.

Pivot points 264(1), 264(2) are positioned outboard of the respective outboard shear bearing 226 of each rotor blade 204(1)-204(3). Pivot points 264(1), 264(2) are located a distance 272 in the outboard direction 270 from the outboard shear bearing 226 of rotor blades 204(1) and 204(2), respectively. The distance 272 is measured along the central longitudinal axis 260(1) and 260(2) of rotor blades 204(1) and 204(2), respectively. Pivot points 264(1), 264(2) are positioned on central longitudinal axes 260(1), 260(2), respectively. The distance 272 is minimized by locating the inboard CF bearing 211 proximal the inboard beam 205.

Figure 7:
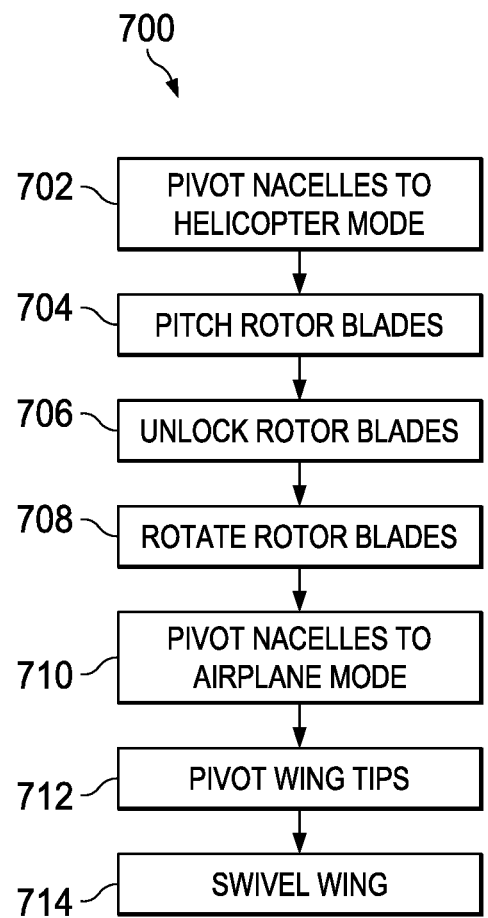
FIG. 7 is a flowchart illustrating actions performed in an exemplary method of converting a tiltrotor aircraft from a flight ready position to a stowed position according to aspects of the disclosure.

FIG. 7 is a flow chart illustrating a method 700 of converting the tiltrotor aircraft 100 from a flight ready position to a stowed position. FIG. 7 will be discussed relative to FIGS. 1-6. At block 702, nacelles 115, 117, which house rotor systems 114, 116, respectively, are pivoted to helicopter mode. Each nacelle 115, 117 is rotated nose up to a nacelle angle of approximately 90°. Each nacelle 115, 117 is at an angle of approximately 90° when the longitudinal axis of each nacelle 115, 117 is generally vertical relative to the ground. With nacelles 115, 117 at an angle of approximately 90°, each blade assembly 202 of each rotor system 114, 116 is oriented generally horizontal relative to the ground. At block 704, each rotor blade 204 of the rotor systems 114, 116 is pitched about its central longitudinal axis 260 to a high collective position in which the leading edge 248 of each rotor blade 204 is generally facing upward. Pitching the rotor blades 204 in this way is referred to as indexing the rotor blades. Pitch-horn actuators operatively connected to the pitch horns facilitate the change in pitch of the rotor blades 204.

At block 706, each to-be-folded rotor blade 204 (e.g., rotors 204(1) and 204(2) of FIG. 6) is unlocked from its respective blade fold supports 220, 221. In some embodiments, actuators operatively connected to lock assembly 250 disengage tabs 252, 253 from engagement with slots 238, 239. In some embodiments, the lock assembly 250 may be operated manually to disengage the tabs 252, 253 from the slots 238, 239. The position and quantity of to-be-folded rotor blades can vary depending on rotor blade assembly configuration (e.g., the embodiment of FIG. 6 illustrates that two of the three rotor blades are folded).

At block 708, each to-be-folded rotor blade 204 is rotated about its pivot axis (e.g., the central axis 244 of the blade fold bolt 240) to move each to-be-folded rotor blade 204 toward the folded position. In some embodiments, actuators operatively connected to the rotor blades 204 facilitate the rotational movement of the rotor blades. In some embodiments, the rotational movement of the rotor blades 204 is done manually. Each of the to-be-folded rotor blades 204 are rotated toward the fuselage 102 until the rotor blades 204 are generally parallel with each other. In some embodiments, physical stops or proximity sensors are used that signal that the actuators should cease movement of the rotor blades when the rotor blades have reached the desired folded position.

At block 710, nacelles 115, 117 are pivoted to airplane mode. Each nacelle 115, 117 is rotated to a nacelle angle of approximately 0°. The nacelle is at an approximately 0° angle when the longitudinal axis of the nacelle is generally horizontal relative to the ground. With the rotor blades 204 in the folded position, each of the rotor blades 204 remains generally horizontal relative to the ground when the nacelles 115, 117 are at an angle of approximately 0°.

At block 712, wing tips 110, 112 are pivoted toward the fuselage 102. At block 714, the wing 108 is swiveled about the vertical axis 122 to lie above and generally align with the fuselage 102. The entire method 700 of converting tiltrotor aircraft 100 from an operational flight ready position to a stowed position can be completed in a range of 1 to 2 minutes in a wind of up to at least 60 knots. The method 700 can be interrupted or stopped at any point to facilitate maintenance. In embodiments using actuators to manipulate one or more components of the tiltrotor aircraft 100, manual operation is instead possible in the event of a system failure. It is to be understood that several of the actions of method 700 may occur simultaneously or in different order. The order of actions of the method 700 is not meant to be limiting.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A folding rotor blade assembly for an aircraft, the folding rotor blade assembly comprising:
   a yoke;
   an inboard beam coupled to the yoke;
   an inboard centrifugal force bearing coupled to the inboard beam;
   a grip coupled to the inboard beam;
   an outboard bearing housing coupled to the grip; and
   a rotor blade pivotally coupled to the grip by a blade fold bolt that is positioned outboard of the outboard bearing housing.

2. The folding rotor blade assembly of claim 1, comprising a blade fold support coupled to the grip by the blade fold bolt.

3. The folding rotor blade assembly of claim 2, comprising a lock assembly coupled to the blade fold support and configured to lock the rotor blade in an extended position.

4. The folding rotor blade assembly of claim 3, wherein:
the rotor blade comprises a blade tang that extends from an inboard end of the rotor blade toward the yoke; and
the lock assembly includes a tab that, in a first position, abuts the blade tang and prevents the rotor blade from rotating relative to the blade fold support and, in a second position, allows the rotor blade to rotate relative to the blade fold support.

5. The folding rotor blade assembly of claim 2, wherein the blade fold bolt passes through the blade fold support, the rotor blade, and the grip.

6. The folding rotor blade assembly of claim 1, comprising:
an inboard bearing assembly coupled between the inboard beam and the yoke;
a yoke flexure extending from the yoke and coupled to the outboard bearing housing; and
an outboard bearing assembly coupled between the outboard bearing housing and the yoke flexure.

7. The folding rotor blade assembly of claim 6, wherein the yoke flexure and the outboard bearing assembly are coupled together by a spindle.

8. The folding rotor blade assembly of claim 6, wherein the inboard bearing assembly comprises an inboard shear bearing and the inboard centrifugal force bearing.

9. The folding rotor blade assembly of claim 6, wherein the outboard bearing assembly comprises an outboard shear bearing.

10. The folding rotor blade assembly of claim 8, wherein the inboard shear bearing is coupled to the inboard centrifugal force bearing.

11. A folding rotor blade assembly for an aircraft, the folding rotor blade assembly comprising:
a yoke connected to and axially aligned with a hub spring assembly;
an inboard beam housing an inboard centrifugal force bearing, the inboard beam connected to the yoke;
a grip connected at a first end to the inboard beam;
an outboard bearing housing connected to a second end of the grip;
an outboard bearing assembly coupled between the outboard bearing housing and the second end of the grip;
a blade fold support connected to the grip and the outboard bearing housing; and
a rotor blade connected to the grip at a pivotal connection positioned outboard of the outboard bearing assembly.

12. The folding rotor blade assembly of claim 11, wherein the pivotal connection comprises a blade fold bolt that passes through the rotor blade and the grip.

13. The folding rotor blade assembly of claim 12, comprising a lock assembly coupled to the blade fold support and configured to lock the rotor blade in an extended position.

14. The folding rotor blade assembly of claim 13, wherein:
the rotor blade comprises a blade tang that extends from an inboard end of the rotor blade toward the yoke; and
the lock assembly includes a tab that in a first position abuts the blade tang and prevents the rotor blade from rotating relative to the blade fold support and in a second position allows the rotor blade to rotate relative to the blade fold support.

15. The folding rotor blade assembly of claim 13, comprising:
an inboard bearing assembly coupled between the inboard beam and the yoke;
a yoke flexure extending from the yoke and coupled to the outboard bearing housing; and
an outboard bearing assembly coupled between the outboard bearing housing and the yoke flexure.

16. A method comprising:
pitching a first rotor blade of a rotor blade assembly, the rotor blade assembly comprising:
an inboard bearing assembly comprising an inboard centrifugal force bearing and connected to a yoke and a grip;
an outboard bearing assembly connected to the yoke and the grip;
a blade fold support connected to the grip; and
wherein the first rotor blade is pivotally connected to the blade fold support via a blade fold bolt, the blade fold support configured to prevent a pivoting rotation of the first rotor blade relative to the yoke when the blade fold support is in a locked configuration, the blade fold bolt providing a pivot axis outboard of the outboard bearing assembly;
unlocking the first rotor blade to allow the first rotor blade to pivot relative to the yoke; and
rotating the first rotor blade about the pivot axis.

17. The method of claim 16, wherein the rotor blade assembly further comprises a lock assembly attached to the blade fold support.

18. The method of claim 17, wherein the unlocking comprises moving a tab of the lock assembly to allow the first rotor blade to pivot relative to the yoke.

19. The method of claim 16, comprising pitching and unlocking a second rotor blade.

20. The method of claim 19, wherein the first and second rotor blades are rotated to be generally parallel with each other and a third rotor blade.

* * * * *